United States Patent
Xiao et al.

(10) Patent No.: US 11,830,263 B2
(45) Date of Patent: Nov. 28, 2023

(54) PREPROCESSOR TRAINING FOR OPTICAL CHARACTER RECOGNITION

(71) Applicant: Intuit Inc., Mountain View, CA (US)

(72) Inventors: Xiao Xiao, San Diego, CA (US); Sricharan Kallur Palli Kumar, Mountain View, CA (US); Ayantha Randika Ponnamperuma Arachchige, Edmonton (CA); Nilanjan Ray, Edmonton (CA); Homa Foroughi, Edmonton (CA); Allegra Latimer, Redondo Beach, CA (US)

(73) Assignee: Intuit Inc., Mountain View, CA (US)

( * ) Notice: Subject to any disclaimer, the term of this patent is extended or adjusted under 35 U.S.C. 154(b) by 405 days.

(21) Appl. No.: 17/349,623

(22) Filed: Jun. 16, 2021

(65) Prior Publication Data

US 2022/0405520 A1     Dec. 22, 2022

(51) Int. Cl.
| | |
|---|---|
| *G06V 30/148* | (2022.01) |
| *G06N 3/08* | (2023.01) |
| *G06F 18/25* | (2023.01) |
| *G06F 18/214* | (2023.01) |
| *G06V 30/10* | (2022.01) |

(52) U.S. Cl.
CPC .......... *G06V 30/153* (2022.01); *G06F 18/214* (2023.01); *G06F 18/25* (2023.01); *G06N 3/08* (2013.01); *G06V 30/10* (2022.01)

(58) Field of Classification Search
CPC ...... G06V 30/10; G06V 30/153; G06V 10/82; G06F 18/25; G06F 18/214; G06N 3/08
See application file for complete search history.

(56) References Cited

PUBLICATIONS

Sporici, D., Cusnir, E., Boiangiu, C.A. "Improving the accuracy of tesseract 4.0 OCR engine using convolution-based preprocessing", Symmetry, May 2, 2020, 19 pages.

Mohamed, S., Rosca, M., Figurnov, M., Mnih, A., "Monte Carlo gradient estimation in machine learning", Journal of Machine Learning Research, Sep. 29, 2020, 62 pages.

Jacovi, A., Hadash, G., Kermany, E., Carmeli, B., Lavi, O., Kour, G., Berant, J., "Neural network gradient-based learning of black-box function interfaces", ICLR 2019, Jan. 13, 2019, 14 pages.

Nguyen, N.M., Ray, N., End-to-end learning of convolutional neural net and dynamic programming for left ventricle segmentation, Proceedings of Machine Learning Research. vol. 121, May 6, 2019, 9 pages.

Sauvola, J., Pietikainen, M., "Adaptive document image binarization", Pattern Recognition 33, Jan. 21, 1999, 12 pages.

*Primary Examiner* — Daniel G Mariam
(74) *Attorney, Agent, or Firm* — FERGUSON BRASWELL FRASER KUBASTA PC

(57) ABSTRACT

A method includes executing a Optical Character Recognition (OCR) preprocessor on training images to obtain OCR preprocessor output, executing an OCR engine on the OCR preprocessor output to obtain OCR engine output, and executing an approximator on the OCR preprocessor output to obtain approximator output. The method further includes iteratively adjusting the approximator to simulate the OCR engine using the OCR engine output and the approximator output, and generating OCR preprocessor losses using the approximator output and target labels. The method further includes iteratively adjusting the OCR preprocessor using the OCR preprocessor losses to obtain a customized OCR preprocessor.

20 Claims, 8 Drawing Sheets

*← 900*

---
Algorithm 1: Proposed training
---
    input: $\sigma, S, \{Training\ Images, Ground\ Truths\}$
1   for $I, l_{gt} \in \{Training\ Images, Ground\ Truths\}$ do
2       $g = Preprocessor(I);$
3       intialize $s$ to 0;
4       while $s < S$ do
5           sample $\epsilon_s \sim \mathcal{N}(0, \sigma);$
6           $\mathcal{M}_s = \mathcal{M}(Approximator(g + \epsilon_s), OCR(g + \epsilon_s));$
7           $s = s + 1;$
8       $min_\phi \sum_s \mathcal{M}_s;$
9       $min_\psi \mathcal{Q}(Approximator(g), l_{gt});$
---

$$\mathcal{Q} = CTC(Approximator(g), p_{gt}) + \beta * MSE(g, J_{m \times n})$$

Algorithm 2: Gradient approximation by SFE

Function GetGradients($Image$, $p_{gt}$, $\sigma$, $n$):
    $g = Preprocessor(Image)$;
    sample $\epsilon_1, \ldots \epsilon_n \sim \mathcal{N}(0, \mathcal{I})$;
    $\epsilon_{n+i} = -\epsilon_i$ for $i = 1, \ldots n$;
    $\mathcal{L}_i = \mathcal{L}(OCR(g + \sigma\epsilon_i), p_{gt})$ for $i = 1, \ldots 2n$;
    $gradient = \frac{1}{2n\sigma} \sum_{i=1}^{2n} \mathcal{L}_i \epsilon_i$;
    return $gradient$;

*FIG. 9C*

$$\mathcal{R} = Levenshtein(s, l_{gt}) + \beta * MSE(g, J_{m \times n})$$

*FIG. 9D*

PREPROCESSOR TRAINING FOR OPTICAL CHARACTER RECOGNITION

BACKGROUND

Optical character recognition (OCR) is the process of extracting and converting printed or handwritten text (e.g., characters and words) in an image into computer encoded text. OCR engines based on deep learning (i.e., machine learning) to have achieved improvements in both accuracy and efficiency. Accordingly, general commercial OCR engines are provide document handling tasks in various domains. Many of the OCR engines provide OCR via cloud-based Software as a Service (SaaS) delivery model. Thus, a software application can request OCR from the commercial OCR engine and receive the computer encoded text.

SUMMARY

In general, in one aspect, one or more embodiments relate to a method that includes executing a Optical Character Recognition (OCR) preprocessor on training images to obtain OCR preprocessor output, executing an OCR engine on the OCR preprocessor output to obtain OCR engine output, and executing an approximator on the OCR preprocessor output to obtain approximator output. The method further includes iteratively adjusting the approximator to simulate the OCR engine using the OCR engine output and the approximator output, and generating OCR preprocessor losses using the approximator output and target labels. The method further includes iteratively adjusting the OCR preprocessor using the OCR preprocessor losses to obtain a customized OCR preprocessor.

In general, in one aspect, one or more embodiments relate to a system. The system includes a computer processor and a training engine configured to execute on the computer processor. The training engine is further configured to trigger execution of an OCR preprocessor to preprocess training images and to obtain first OCR preprocessor output, trigger execution of an OCR engine to perform OCR on the OCR preprocessor output to obtain OCR engine output, and trigger execution of an approximator on the OCR preprocessor output to obtain approximator output. The training engine is further configured to iteratively adjust the approximator to simulate the OCR engine using the OCR engine output and the approximator output, generate OCR preprocessor losses using the approximator output and target labels, and iteratively adjust the OCR preprocessor using the OCR preprocessor losses to obtain a customized OCR preprocessor.

In general, in one aspect, one or more embodiments relate to a non-transitory computer readable medium that includes computer readable program code for causing a computer system to perform operations. The operations include triggering execution of an OCR preprocessor to preprocess training images and to obtain OCR preprocessor output, triggering execution of an OCR engine to perform OCR on the OCR preprocessor output to obtain OCR engine output, and triggering execution of an approximator on the OCR preprocessor output to obtain approximator output. The operations further include iteratively adjusting the approximator to simulate the OCR engine using the OCR engine output and the approximator output, generating OCR preprocessor losses using the approximator output and target labels, and iteratively adjusting the OCR preprocessor using the OCR preprocessor losses to obtain a customized OCR preprocessor.

Other aspects of the invention will be apparent from the following description and the appended claims.

BRIEF DESCRIPTION OF DRAWINGS

FIG. 9A, FIG. 9B, FIGS. 9C, and 9D show examples in accordance with one or more embodiments.

DETAILED DESCRIPTION

Figure 1:
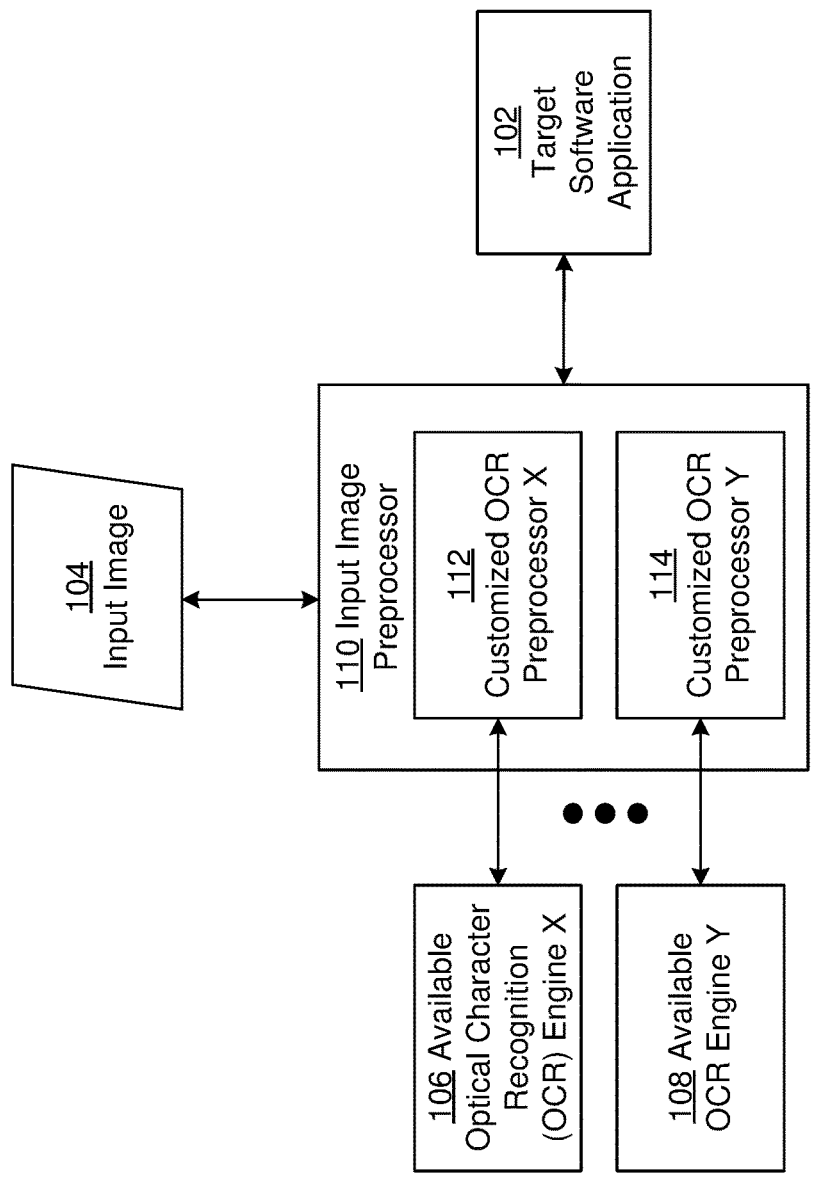
FIG. 1 shows a diagram of a system in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to creating a customized OCR preprocessor that is customized for a particular OCR engine. OCR engines may be general purpose by design, thereby configured to execute across multiple domains. A domain is a sphere of activity or knowledge. Different domains have different document types with unique aberrations and degradations, which can hinder OCR performance. In order to improve performance, one or more embodiments train an OCR preprocessor to enhance input quality prior to the OCR engine. The OCR preprocessor is trained to be domain specific in one or more embodiments. OCR preprocessing may include, for example, image binarization (e.g., converting greyscale to black and white), background elimination, noise removal, illumination correction, geometric deformation correction. The OCR preprocessor may also be a machine learning based solution.

In order to further improve accuracy, the OCR preprocessor is customized for an OCR engine. However, direct training of an OCR preprocessor for customization with an OCR engine may not be possible. The most direct way is to use training data that is an optimal input distribution to the OCR engine. However, the optimal input distribution may be unavailable. A second way of optimizing parameters of the preprocessor is by calculating the gradient of the OCR error, propagating the gradient to the OCR preprocessor using the backpropagation algorithm, and updating the OCR preprocessor parameters to minimize the error. The second way uses the output of the OCR engine and propagates losses through the OCR engine. However, the internal mechanisms of the OCR engine may be unknown. Thus, the losses cannot be propagated through the OCR engine.

In view of the above technical challenges for training an OCR preprocessing engine, embodiments use an approximator that simulates the OCR engine. Namely, the approximator is first trained to simulate the OCR engine. When the approximator is trained or during training, the approximator is used to train the OCR preprocessor. Thus, the OCR preprocessor is indirectly trained to be customized for the OCR engine. Moreover, in one or more embodiments, the input training data is domain specific. Thus, the approximator is trained to match the OCR engine processing of the domain specific input training data. Because of using the domain specific input training data, the errors of the OCR engine, and, correspondingly, the approximator, are errors in the particular domain. Because the errors are in the particular domain, the OCR preprocessor is further trained to provide output that improves accuracy of the particular OCR engine for the particular domain. Thus, one or more embodiments improve computer accuracy in performing OCR by training an OCR preprocessor to be customized for a particular OCR engine and a particular domain.

FIG. 1 shows a diagram of a system in accordance with one or more embodiments. Specifically, FIG. 1 shows a diagram of an interrelationship between various components in accordance with one or more embodiments. As shown in FIG. 1, the system includes a target software application (102), an input image (104), one or more available OCR engines (e.g., available OCR engine X (106), available OCR engine Y (108)), and an input image preprocessor (110). Each of these components is described below.

The target software application (102) is a software program that processes computer encoded text in a document. Computer encoded text is text that is encoded at the character (e.g., including symbols) and/or word level rather than the pixel level. Namely, the computer encodes the text as text rather than as an image in the computer encoded text. A document is broadly defined to be any grouping of information that may be stored in a file. For example, a document may be a picture, a scan of a paper document, a contract, a receipt, a form or collection of forms, or any other grouping.

The target software application (102) is configured to process the computer encoded text to perform a function. For example, the function may be to analyze the textual information, generate reports, create database records from forms, perform document modification, or perform any of a myriad of other tasks with the computer encoded text. In one or more embodiments, the target software application (102) may be specific to a particular domain. In some cases, the target software application (102) uses documents from multiple domains, but at least one domain is a target domain. In such a scenario, an OCR engine may be particular to one of the domains.

The input image (104) is an original image in the document. The input image (104) may be in a portion of the document or may be the entire document. For example, the document may be composed of or include multiple input images. Originally, before processing, the document may optionally have some computer encoded text in addition to the input image (104).

The input image (104) may be a scan of a physical document (e.g., using a scanner) or portion thereof, a picture of a physical document (e.g., using a camera), and/or a computer-generated image (e.g., by computer conversion of a document to an image file). In one or more embodiments, the input image (104) is represented in an image format (e.g., using pixels, vector graphics, etc.) rather than textual format. The input image (104) may include aberrations and degradations that are particular to the image. The aberrations and degradations may include irregular coloring, stray markings, distorted text, text at different angles, not all pixels of text captured, variations in handwriting, and other challenges. Different input images (104) may have different types and locations of degradations and aberrations.

Continuing with FIG. 1, the system also includes multiple available OCR engines (e.g., available OCR engine X (106), available OCR engine Y (108)). Each available OCR engine is a distinct program that is configured to perform OCR on the input image (104). Namely, each available OCR engine is a software tool that may be selected from the group of available OCR engines to perform the OCR on an input image. In one or more embodiments, only a single OCR engine is used to perform OCR. OCR engines may have underlying algorithms that perform the OCR. The underlying algorithms may be heterogeneous amongst the different OCR engines. For example, one or more of the OCR engines may have a neural network, with different nodes, layers, and weights than other OCR engines. The underlying algorithms may be unknown to the system. For example, the OCR engine may be a commercial OCR engine that follows a SAAS model or may be a plugin to another component of the system. The OCR engine may be configured to receive a request with the input image and respond with the computer encoded text.

The available OCR engines (e.g., available OCR engine X (106), available OCR engine Y (108)) and the target software application (102) may be communicatively connected to an input image preprocessor (110). The input image preprocessor (110) is a software program that is configured to manage the preprocessing of input images (e.g., input image (104)) to provide a document having computer encoded text to the target software application (102). For example, the input image preprocessor (110) may be a plugin to the target software application (102), may be a component of the target software application (102), and/or may be a separate program. Any configuration of the components of FIG. 1 may be used.

The input image preprocessor (110) includes multiple customized OCR preprocessors (e.g., customized OCR preprocessor X (112), customized OCR preprocessor Y (114)). Each customized OCR preprocessor is customized for a corresponding OCR engine. Thus, for example, customized OCR preprocessor X (112) is customized for available OCR engine X (106) and customized OCR preprocessor Y (114) is customized for available OCR engine Y (108).

The customized OCR preprocessor is configured to transform the input image into a more optimal image for the corresponding OCR engine. The transformation may account for particular domain. As such, the transformation may account for aberrations and deformities common to the particular domain. For example, the transformation may be an image correction or modification of various parts of the input image. The particular transformation is dependent on the domain and the OCR engine. In one or more embodiments, the customized OCR preprocessor is a neural network.

Figure 2:
FIG. 2 shows a diagram of a system in use in accordance with one or more embodiments.

FIG. 2 shows a diagram of a system in use in accordance with one or more embodiments. The components of FIG. 2 are the same or similar to the like-named components of FIG. 1. Turning to FIG. 2, the image input preprocessor (not shown) is configured to select the available OCR engine for an input image (202). When selected, the selected available OCR engine is a target OCR engine (206). Based on the target OCR engine (206), the image input preprocessor triggers the customized OCR preprocessor (204) to preprocess the input image (202). The preprocessed input image is passed to the target OCR engine (206). The target OCR engine (206) generates OCR engine output (208) that is passed to a target software application (210).

Figure 3:
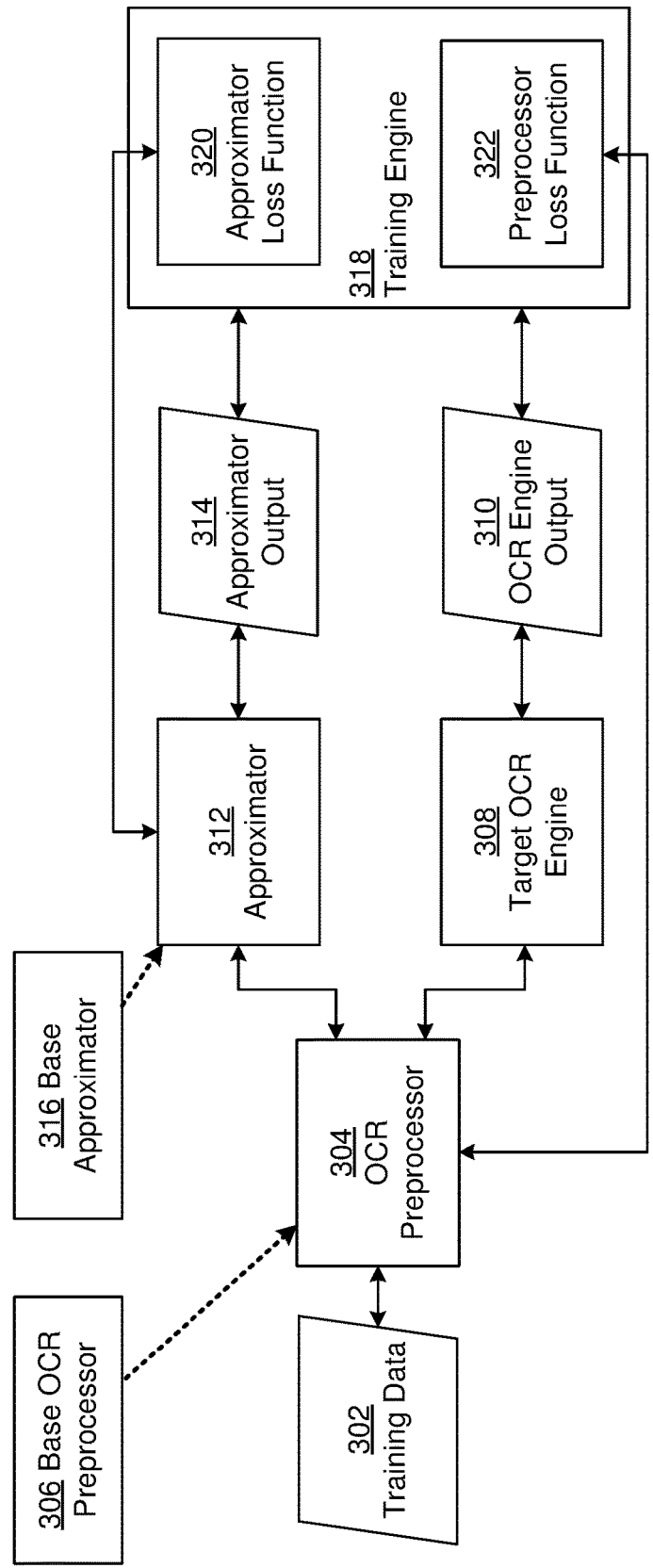
FIG. 3 shows a diagram of a training system in accordance with one or more embodiments.

To create the customized OCR preprocessor, training is performed, and the customized OCR preprocessor is iteratively updated. FIG. 3 shows a diagram of a training system in accordance with one or more embodiments. As shown in FIG. 3, the training system includes training data (302), OCR preprocessor (304), base OCR preprocessor (306), a target OCR engine (308), OCR engine output (310), approximator (312), approximator output (314), base approximator (316), and a training engine (318). The training engine (318) includes an approximator loss function (320) and a preprocessor loss function (322). Each of these components is discussed below.

The training data (302) is a set of images that include text in image format and a set of target labels. For example, the text may be handwriting, typed text, print, cursive or any other type of text in which the encoding is at an image level, such as at the pixel level. Namely, at least some of the text, which is the target for the OCR processing, is formatted as an image rather than characters.

Labeling of the training data may be human generated labels or computer-generated labels (e.g., via one or more validated OCR engines). A target label is computer encoded text with a stored related position. Namely, each target label is a combination of computer encoded text and a position identifier of the stored related position. The position identifier may be a bounding box location or another identifier of the position. For example, to create the target labels, one or more users may put a bounding box around a location of text and type in the text at the location. Thus, the training data (302) is both the original image and the expected output of the OCR engine.

In one or more embodiments, the training data (302) is domain specific. Each input image in the training data is in the domain. For example, the underlying documents in the input image is in the domain. Further, in one or more embodiments, the training data spans the variety of input images of the domain. Specifically, the types of aberrations and deformities in the input images spans the types in the domain. Further, in one or more embodiments, the distribution of aberrations and deformities matches the distribution of expected input images for the domain. By using domain specific training data, the OCR preprocessor (304) is trained for the particular domain in addition to the OCR engine.

The training data is used as input to an OCR preprocessor (304). The OCR preprocessor is a neural network machine learning model that is configured to transform an input image into an output image. The output image may be referred to as preprocessor output or output of the OCR preprocessor. The output image is a modified image modified to change OCR processing to be accurate for the domain. For example, contracts that generally have dark words close together may benefit from skeletonization processing that reduces stroke distance to one-dimensional curves whereas receipts with dim words that are slanted may benefit from a preprocessing that straightens the image such that the receipt is vertically aligned and changes dim pixels to darker pixels.

A base OCR preprocessor (306) is an initial version of the OCR preprocessor prior to training for the target OCR engine (308). For example, the base OCR preprocessor (306) may be an initial version of a neural network model without training. The base OCR preprocessor (306) may optionally be partially trained to perform image correction. The base OCR preprocessor (306) may be a starting iteration that is used for a variety of customized OCR preprocessors for a variety of OCR engines.

In training, the target OCR engine (308) is the target for creating the customized OCR preprocessor (304). In one or more embodiments, the target OCR engine (308) is one of the available OCR engines discussed above with reference to FIG. 1. Further, in one or more embodiments, the target OCR engine (308) operates agnostically to the existence of the OCR preprocessor (304). Namely, the target OCR engine (308) processes input regardless of whether the input is the original input image in the training data or the preprocessed input image. The differences in the processing may be the quality of the output produced by the OCR engine.

The target OCR engine (308) may be fully trained in that further updating of the target OCR engine is not performed using the system of FIG. 3. However, the target OCR engine may be continually updated by a separate training process. For example, a third party may iteratively update the target OCR engine as a general-purpose OCR engine. The iterative updating may not account for training data (302). Thus, for the purposes of the training system of FIG. 3, the target OCR system is treated as a "black box" whereby the underlying algorithms are unknown, and training of the target OCR engine is not performed.

The target OCR engine (308) is configured to produce OCR engine output (310). The OCR engine output (310) includes computer encoded text and the identifiers of the positions of the text in the input image. The OCR engine output (310) includes errors during the training process. Errors may be in the form of text that is not recognized and/or incorrect characters. Through the iterative update process of training, the OCR preprocessor (304) is trained to minimize the errors in the OCR engine output (310). The training is indirect in that the training uses approximator (312).

An approximator (312) is a neural network that is trained to simulate the target OCR engine (308). The approximator (312) is configured to produce approximator output (314). For the same preprocessor output to the approximator (312) and the target OCR engine (308), the approximator (312) is trained to replicate the OCR engine output (310) as the approximator output (314) within a margin of error. The format of the approximator output (314) matches the format of the OCR engine output (310). With the target OCR engine (308) being treated as a "black box," the operations performed by the approximator (312) may be different than the operations performed by the target OCR engine (308). Through iterative updating, the approximator (312) is modified to match the target OCR engine (308). Thus, the approximator (312) is customized for a particular OCR engine.

The approximator (312) is generated from a base approximator (316). The base approximator (316) is an initial version of an approximator (312) that is not yet customized for a particular OCR engine. For example, the base approximator (316) may be generic to multiple OCR engines. Thus, similar to the base OCR preprocessor (306) for the OCR preprocessor (304), the base approximator (316) may be a template for the approximator (312).

The approximator output (314) and the OCR engine output (310) are used as input to the training engine (318). The training engine (318) is a software program configured to train the approximator (312) and the OCR preprocessor (304). Specifically, the training engine (318) is configured to trigger the execution of the OCR preprocessor (304), the approximator (312), and the target OCR engine (308), and to update the OCR preprocessor (304) and the approximator (312).

The training engine (318) includes an approximator loss function (320) and a preprocessor loss function (322). The approximator loss function (320) calculates the approximator losses. The approximator losses represents the degree of mismatch between the approximator output (314) and the OCR engine output (310). Specifically, the approximator losses are based on the error between the approximator output and the OCR engine output. For calculating the approximator losses, the OCR engine output is the ground truth (i.e., considered the correct output).

The preprocessor loss function (322) represents the degree of error between the OCR engine output (310) as simulated by the approximator output (314) and the target labels of the original images in the training data. The preprocessor loss function further accounts for the extra processing of the approximator (312) by backpropagation through the approximator. The preprocessor loss, which indicates the error between the approximator output and the target labels of the original images, is propagated through the whole network, from the approximator back to the preprocessor. When propagated through the approximator, the parameters of the approximator are not updated. Rather, the backpropagation through the approximator is only to determine the gradients to apply to the preprocessor.

Figure 4:
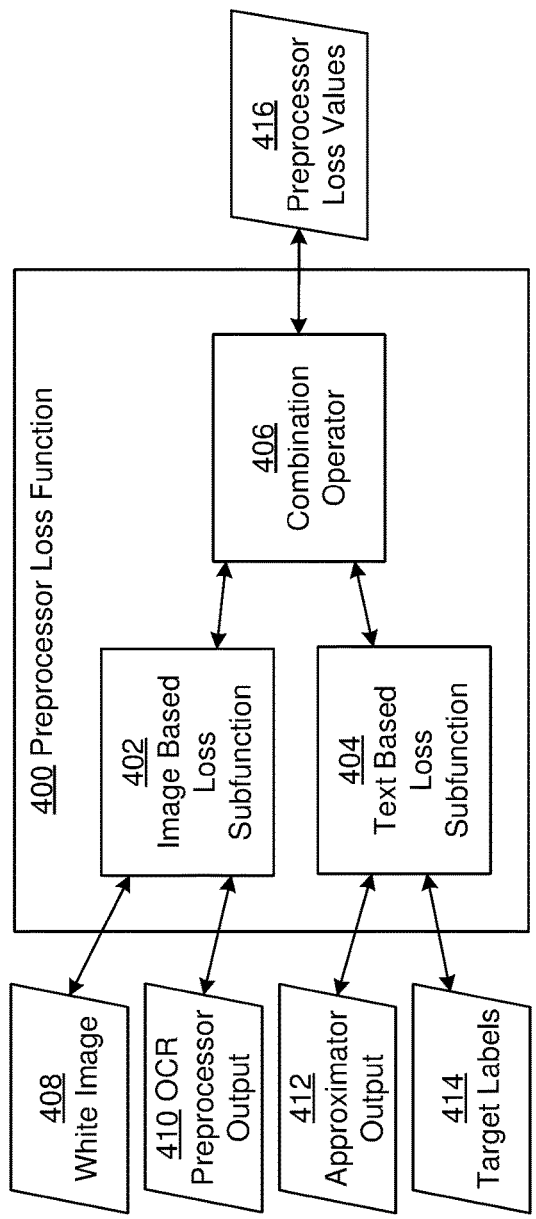
FIG. 4 shows a diagram of a preprocessor loss function in accordance with one or more embodiments.

FIG. 4 shows a diagram of an example preprocessor loss function (400) in accordance with one or more embodiments. In one or more embodiments, the preprocessor loss function (400) includes an image-based loss subfunction (402), a text-based loss subfunction (404) and a combination operator (406). The image-based loss subfunction (402) generates image-based losses. Image based losses are losses in an image as determined by differences within the two images. The text-based loss subfunction generates text base losses. Text based losses are losses in text as determined by the differences in computer encoded text. Therefore, whereas image-based losses may be at pixel level, text-based losses are at computer encoded text level.

The image-based loss subfunction (402) uses, as input, a white image (408) and OCR preprocessor output (410). The white image is an image of all white pixels in one or more embodiments. One skilled in the art will appreciate that if colors are inverted in the input, a black image is equivalent for the purposes of the claims. Similarly, an image is considered all white if up to a threshold number of pixels are non-white without substantially altering the image-based losses.

The text-based loss subfunction (404) uses, as input, approximator output (412) and target labels (414). The approximator output (412) is the text-based output of the approximator. The approximator output may be a probability distribution. The target labels (414) are the original labels in the training data. In one or more embodiments, the approximator output (412) is matched on a per position basis the target labels (414). Thus, each character in the computer encoded text of the target labels (414) is compared against the corresponding character in computer encoded text of the approximator output (412) to generate the text-based losses.

A combination operator (406) is configured to combine the image-based losses and the text-based losses into preprocessor losses (i.e., preprocessor loss values (416)). For example, the combination operator (406) may be a weighted summation or another mathematical function that combines the respective losses.

The text-based loss ensures the preprocessor preserves the text content on the document, while the image-based loss with respect to a completely blank image reduces background clutter. A combined loss of both components achieves both goals simultaneously.

Figure 5:
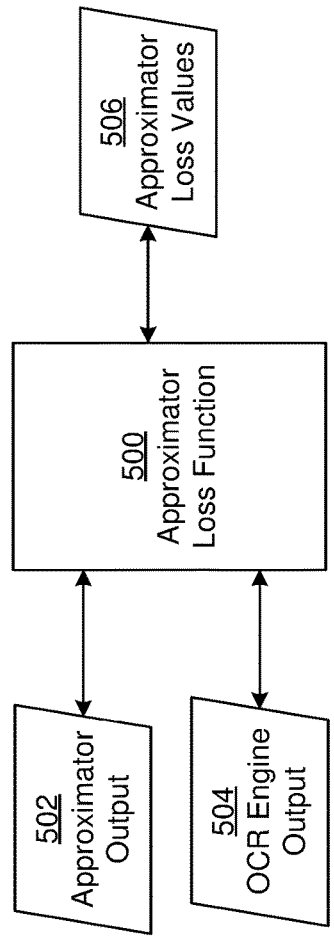
FIG. 5 shows a diagram of an approximator loss function in accordance with one or more embodiments.

FIG. 5 shows a diagram of an approximator loss function in accordance with one or more embodiments. As discussed above, the approximator loss function (500) is designed to calculate the approximator loss in order to adjust the approximator to simulate the OCR engine. As such, the approximator loss function (500) receives, as input, approximator output (502) and OCR engine output (504) and produces, as output, approximator losses (i.e., approximator loss values (506)). The approximator output (502) and OCR engine output (504) are both computers encoded text. The approximator loss function (500) matches the computer encoded text based on position and then compares the computer encoded text at the respective positions to calculate the approximator losses. Notably, the OCR engine output (504) may be imperfect. However, a goal of the iterative updating of the approximator is such that the same imperfections are in the approximator output (502). Namely, the approximator is adjusted through the approximator loss function to mimic the imperfections of the OCR engine rather than to correctly extract computer encoded text from the OCR engine.

Figure 6:
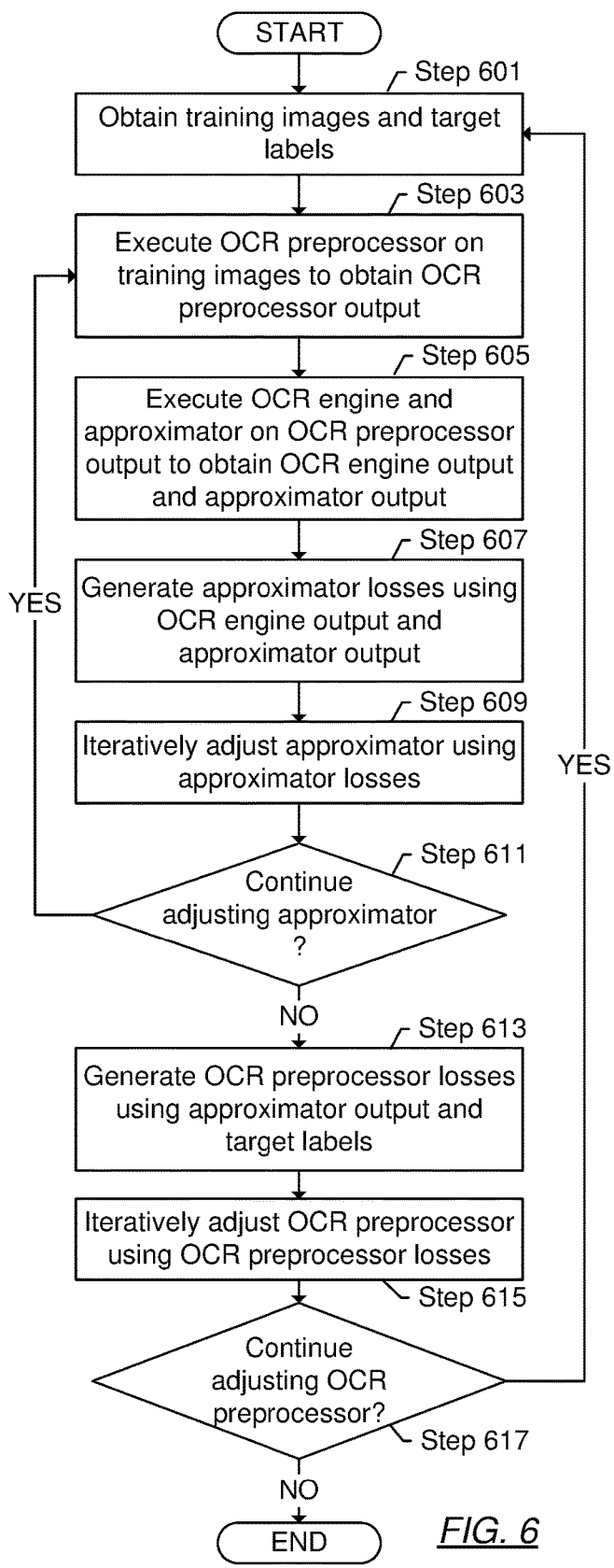
FIG. 6 shows a flowchart for training a preprocessor for optical character recognition in accordance with one or more embodiments.
Figure 7:
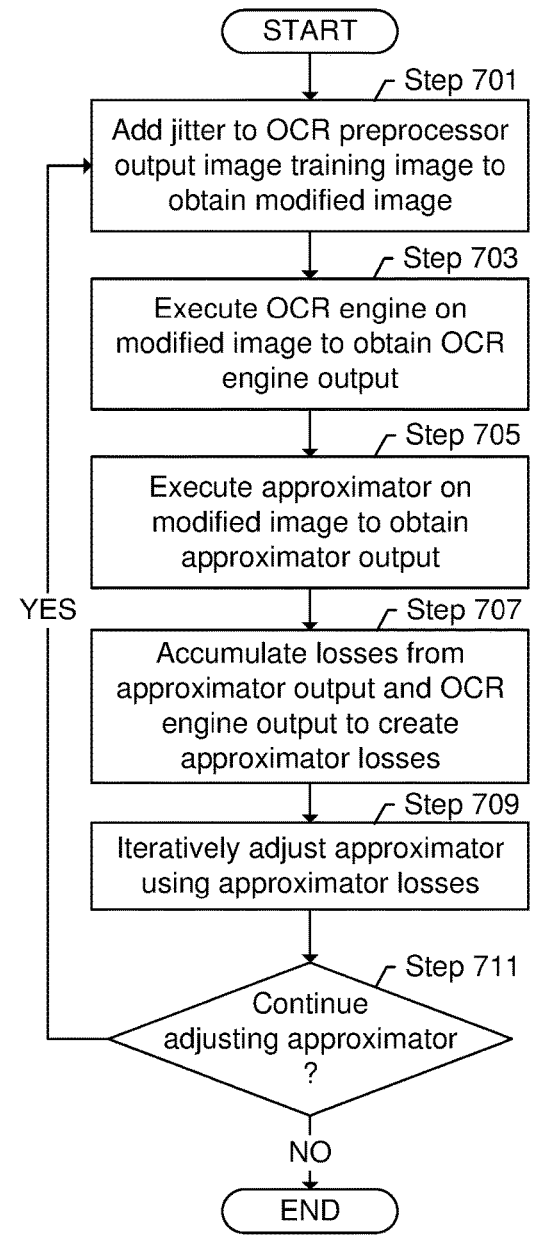
FIG. 7 shows a flowchart for training an approximator to simulate OCR engine in accordance with one or more embodiments.

FIG. 6 and FIG. 7 are flowcharts for training the approximator and the OCR preprocessor to customize the approximator and the OCR preprocessor for the OCR engine. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 6 shows a flowchart for training an OCR preprocessor for an OCR engine in accordance with one or more embodiments. In Step 601, training images and target labels are obtained. The training images and the target labels are training data that may be stored in a training data store. The training data may be acquired over time and/or by asking users to label images.

In Step 603, an OCR preprocessor is executed on the training images to obtain OCR preprocessor output. The execution of the OCR preprocessor may be performed in stages with batches of training images. Initially, at the start of training, a copy of the base OCR preprocessor is used. Thus, at the start of training, the base OCR preprocessor executes on an initial batch of training images. With each batch, the OCR preprocessor is iteratively updated. Thus, for subsequent batches, the OCR preprocessor becomes increasingly customized for the OCR engine.

In Step 605, the OCR engine and the approximator are executed on the OCR preprocessor output to obtain OCR engine output and approximator output. For a current batch, the OCR engine and the approximator are executed on the batch of input images that have been preprocessed by the current iteration of OCR preprocessor. In some embodiments, the OCR engine execution is performed by initiating a request to a third-party OCR engine, such as by using an application programming interface (API) of the OCR engine. The OCR engine may execute locally or remotely. As such, OCR processing may be a local processing, or the request may be transmitted to a remote endpoint. The training engine may trigger the execution of the OCR engine by sending the request to the OCR engine with the OCR preprocessor output. Similarly, the training engine may trigger an execution of the approximator by issuing a request to the approximator with the OCR preprocessor output.

As discussed above, the OCR preprocessor, OCR engine and approximator may be a machine learning model, such as a neural network. In general, a neural network is a set of nodes organized into layers. The initial layer is an input layer and the last layer is an output layer. The layers may also include one or more hidden layers. Each layer has a set of nodes for the layer to perform a transformation. Nodes in different adjacent layers are connected via edges.

A particular node in a layer is communicatively connected via edges to nodes of the previous layer and receives input from the nodes in the previous layer. Further, the particular node may transmit output to nodes of a subsequent layer. The output of the particular node is calculated by calculating an activation function. The output of the particular node is further determined as a function of the weights on the edges to the particular node and may be based on one or more thresholds. Neural networks may operate using forward propagation and backpropagation. Forward propagation may include multiplying inputs to a layer of a neural network by a set of weights and summing the result to generate an output. Namely, for each node (i.e., particular node above), the activation function is calculated using the weights and thresholds.

Backpropagation is the backward propagation of error through the layers of a neural network to update the weights of the layers. The weights may be updated in response to error signals generated from the outputs of the layer. Different nodes in layer may be receive input from a same node in a previous layer. Thus, the updating of a node in a previous layer for a first node may conflict with the updating of the node in the previous layer for a second node. Namely, updating the node of the previous layer may help the output of the first node of a subsequent layer but have a deleterious effect on output of the second node of the subsequent layer. Because of the number of nodes and the various interrelationships between nodes of the different layers, a computer processor is needed to track, calculate, and update the parameters of each node.

Each of the layers of the machine learning models may include multiple layers and form part of a neural network. The layers of the neural networks may include one or more fully connected layers, convolutional neural network (CNN) layers, recurrent neural network (RNN) layers, convolutional recurrent neural network (CRNN) layers, etc. Machine learning models other than neural networks may also be used in embodiments of the disclosure.

Continuing with FIG. 6, in Step 607, approximator losses are calculated using the OCR engine output and the approximator output. To calculate the approximator losses, the approximator loss function is calculated by the processor. The error between the OCR engine output and the approximator output is accumulated and minimized. An example of a loss function that may be used is a connectionist temporal classification (CTC) loss function. However, other text-based loss functions may be used without departing from the scope of the disclosure.

In Step 609, the approximator is iteratively adjusted using the approximator losses. As discussed above, for each batch, an iterative adjustment of the approximator is performed. The iterative adjustment may be performed through back propagation, discussed above. When the approximator is iteratively adjusted based on approximator losses, the parameters (e.g., weights and thresholds) of the OCR preprocessor may be static. Likewise, when iterative adjustment of the OCR preprocessor is performed, the parameters of the approximator are static. Statically setting the parameters does not prevent later updating of the parameters for subsequent batches of training data. Thus, for a particular processing of a batch training images, either the OCR preprocessor or the approximator is updated, but not both at the same time in one or more embodiments. The same batch may be processed multiple times to separately update both. Further, in total, the training images are considered to train both the OCR preprocessor and the approximator when at least a first subset of the training images is used to iteratively update the OCR preprocessor and a second subset is used to iteratively update the approximator regardless of whether the first and second subsets are overlapping.

In Step 611, a determination is made whether to continue adjusting the approximator. Continually adjusting the approximator may be performed until the convergence is achieved or the accumulated error satisfies a threshold. Continually updating may be performed until another stopping condition exists. If the determination is made to continue adjusting the approximator, the flow may return to Step 603 to execute the next batch by the OCR preprocessor. If the determination is made not to continue updating, the flow may proceed to Step 613.

In Step 613, OCR preprocessor losses are determined using the approximator output and the target labels. In one or more embodiments, after a previous updating of the approximator, the approximator is executed on a batch of OCR preprocessor output to generate approximator output for the batch. The target labels for the batch are compared against the target labels for the batch to calculate an error. At this stage, the approximator may be deemed to match the OCR engine and the parameters of the approximator are set as static. Thus, the OCR preprocessor losses are calculated to improve the accuracy of the computer for performing OCR for the particular domain and using the target OCR engine. Calculating the losses may use the CTC loss function, discussed above.

In Step 615, the OCR preprocessor is iteratively adjusted using OCR preprocessor losses. For each of multiple batches, the OCR preprocessor is executed along with the approximator and the losses calculated. Based on the execution, the parameters of the OCR preprocessor are adjusted iteratively through backpropagation, discussed above.

In Step 617, a determination is made whether to continue adjusting the OCR preprocessor. If the determination is made to continue adjusting the OCR preprocessor, then the OCR preprocessor is executed on the next batch and the process repeats. Otherwise, the OCR preprocessor may be deployed to a deployment environment and used in execution of new input images.

FIG. 7 shows a flowchart for training an approximator to simulate OCR engine in accordance with one or more embodiments. In Step 701, jitter is added to an OCR preprocessor image to obtain a modified image. Namely, after the OCR preprocessor executes on a training image and generates OCR preprocessor output that includes an image (i.e., OCR preprocessor image), jitter is added to the image. The jitter may be added by changing random values of the OCR preprocessor image.

In Step 703, the OCR engine is executed on the modified image to obtain OCR engine output. Similarly, in Step 705, the approximator is executed on the modified image to obtain approximator output. Thus, the OCR engine and the approximator are executed on the same modified image. Executing the OCR engine and the approximator on the modified image may be performed as discussed above with reference to FIG. 6.

In Step 707, losses calculated form the approximator output and the OCR engine output are accumulated to create the approximator losses. For each training image in the batch, the losses are accumulated with other losses of other training images in the batch in accordance with a loss function. Thus, each execution may contribute to the approximator losses.

In Step 709, the approximator is iteratively adjusted using the approximator losses. The iterative adjustment is performed as discussed above with reference to FIG. 6.

In Step 711, a determination is made whether to continue adjusting the approximator. The determination may be based on how well the approximator mimics the OCR engine. If the determination is made to continue adjusting the approximator, then the flow continues with Step 701. Otherwise, the flow ends.

Figure 8:
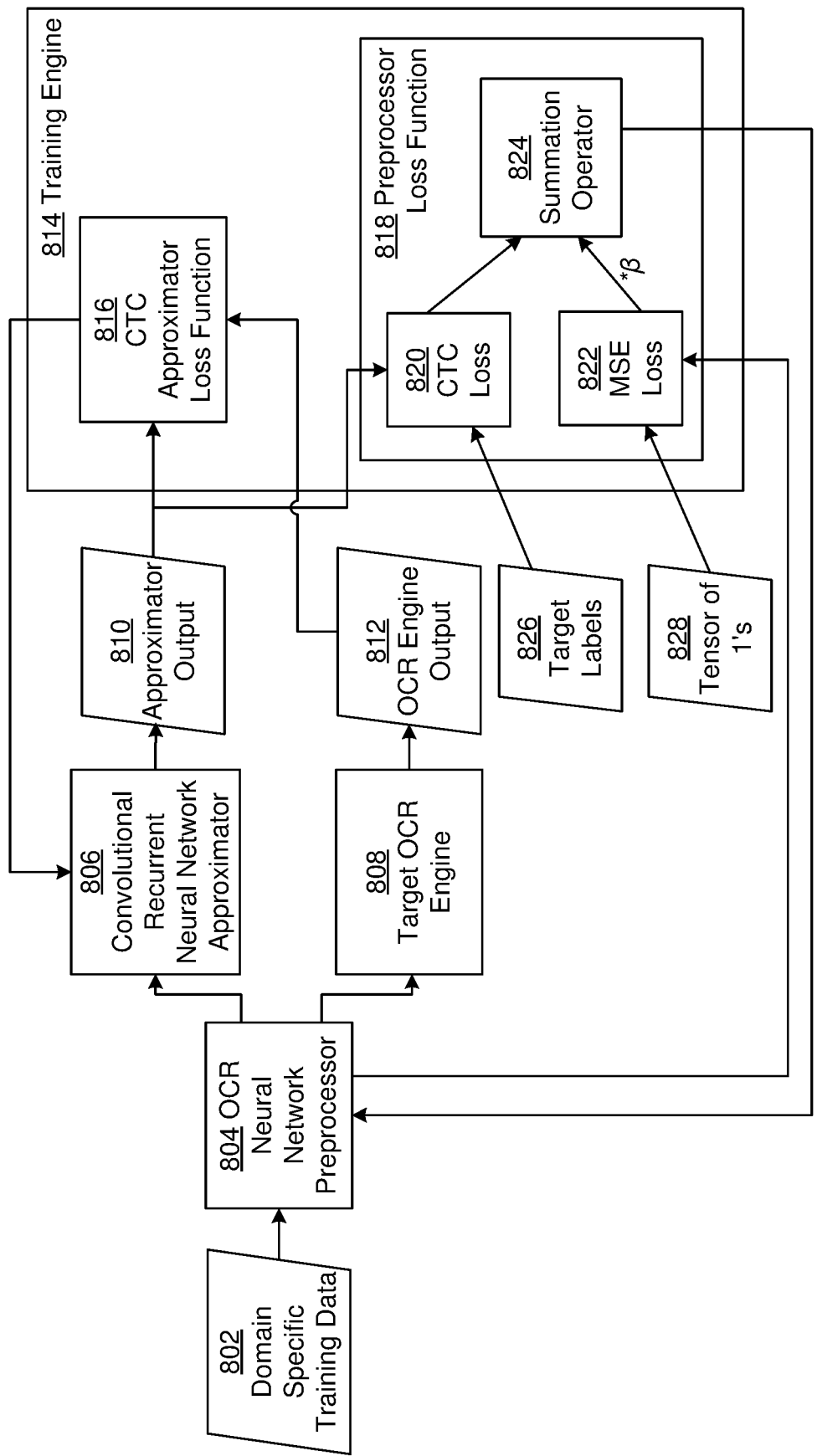
FIG. 8 shows an example diagram in accordance with one or more embodiments.

The following example is for explanatory purposes only and not intended to limit the scope of the invention. FIG. 8 shows an example diagram in accordance with one or more embodiments. As shown in FIG. 8, domain specific training data (802) is provided to an OCR neural network preprocessor (804). The OCR neural network preprocessor output is passed to a CRNN approximator (806), which generates approximator output (810), and target OCR engine (808), which generates OCR engine output (812). When the OCR neural network preprocessor output is passed to the CRNN approximator (806) and target OCR engine (808) jitter may be added for the purposes of training the CRNN approximator (806). Separately, when the OCR neural network preprocessor output for training the OCR neural network preprocessor, no jitter is added.

A training engine (814) calculates losses. Specifically, a CTC approximator loss function (816) is calculated using the approximator output (810) and the OCR engine output (812). The CTC approximator loss function (816) is a CTC loss for the approximator. The losses from the CTC approximator loss function (816) is used to iteratively update the CRNN approximator (806). Iterative updating means that the CRNN approximator is updated after each of several batches of training data. The updated CRNN approximator is then used for the next batch. The iterative updating process repeats to continually improve the CRNN approximator.

When the CRNN approximator (806) updating is not performed, the OCR neural network preprocessor (804) is updated using an OCR preprocessor loss function (818) in the training engine (814). The OCR preprocessor loss function (818) combines CTC loss (820) and mean squared error (MSE) loss (822). CTC loss (820) is a text-based loss determined from the approximator output (810) and the target labels (826). MSE loss (822) is an image-based loss which compares the output image from the OCR neural network preprocessor (804) with a tensor of 1's (828). The tensor of 1's (828) is the same size as the number of pixels of the image. The MSE losses are multiplied by a constant (i.e., β) and summed with the CTC losses (820) to generate the preprocessor losses. The preprocessor losses are used to iteratively update the OCR neural network preprocessor (804).

FIG. 9A and FIG. 9B show an example for implementing the above systems in accordance with one or more embodiments. FIG. 9A shows Algorithm 1 (900), which includes two loops. In the 'inner loop', noise in the form of jitter is added to the input to the OCR, then the error M between OCR and the approximator is accumulated as $\Sigma_s M_s$. M is CTC loss calculated using approximator output and OCR output. The 'outer loop' optimizes approximator parameters ($\phi$) by minimizing the accumulated error $\Sigma_s M_s$ and freezing the parameters ($\psi$) of the OCR preprocessor. The other minimization in the 'outer loop' optimizes the parameters ($\psi$) of the preprocessor model while the approximator parameters ($\phi$) are frozen. For this second minimization, the error Q is calculated by comparing the approximator output with the ground truth. Note that Algorithm 1 alternates optimization between the OCR preprocessor and the approximator.

FIG. 9B shows an example OCR preprocessor loss function (902). The loss function used for optimization of preprocessor parameters is CTC loss which uses approximator output and target labels. In addition, MSE loss is calculated by comparing the preprocessor output with a 2-dimensional tensor of ones: $J_{m*n}$, where n and m are the dimensions of the input image. In this context, the two-dimensional tensor of ones represents a completely white image. Sum of the CTC loss and the MSE loss is used as the preprocessor loss function to optimize the preprocessor parameters ($\psi$) in Algorithm 1.

In FIG. 9B, g is the output image from the preprocessor and $p_{gt}$ is the associated ground truth text for the input image. MSE loss component in the loss function nudges the pre-processor to produce a white image. Completely white image implies no output or incorrect output from the approximator which increases CTC error. Thus, background clutter is reduced while preserving the characters. β acts as a hyperparameter to control the effect of MSE loss.

The sigmoid function is part of the model and is used as the final activation function to maintain output values in the range [0; 1]. CRNN may be used as the approximator to avoid gradient vanishing problems when training end-to-end with the OCR preprocessor. An OCR engine generally includes different components for text detection, segmentation, and recognition. However, CRNN only supports text recognition.

Another method to train the OCR preprocessor is to perform gradient approximation without using an approximator. For example, a gradient estimation alternative shown in Algorithm 2 of FIG. 9C may be used. In Algorithm 2, the OCR engine outputs a text string. Levenshtein distance may be used as a loss function, represented by L in Algorithm 2 (904). In Algorithm 2, n perturbations of c are sampled from the normal distribution. Mirrored sampling' is used to reduce the variance and generate 2n perturbations from the n perturbations. In mirrored sampling, the n number of $\varepsilon$ originally sampled from the normal distribution are negated to create a total of 2n samples. Noise samples $\varepsilon$ are added to the preprocessed image to obtain 2n perturbations of the image. The generated 2n samples are sent to the OCR engine and the resulting text is evaluated to produce the final loss. Specifically, the error compared to the ground truth text is accumulated and multiplied by corresponding c to produce the error gradient.

Composite loss for Algorithm 2 may be calculated using FIG. 9D and used to update the OCR preprocessor. In FIG. 9D, s is the OCR output for some input image I and $l_{gt}$ is the associated ground truth text. Further, g is the output of the OCR preprocessor on input image I and $J_{m \times n}$ is a 2-dimensional tensor of ones in the shape of the input image. The gradient of the Levenshtein distance component of this loss is approximated by the gradient calculation in Algorithm 2.

Figure 10A:
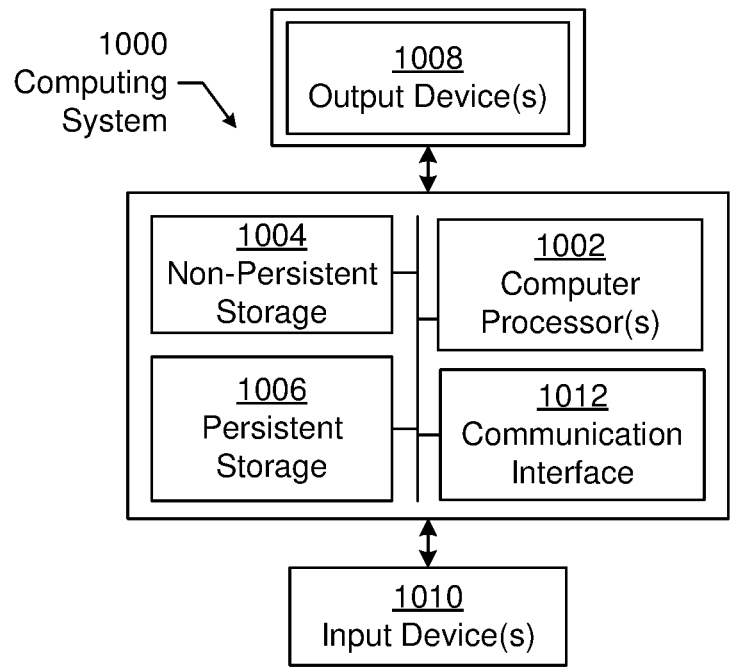
FIG. 10A and FIG. 10B show a computing system in accordance with one or more embodiments.
Figure 10B:
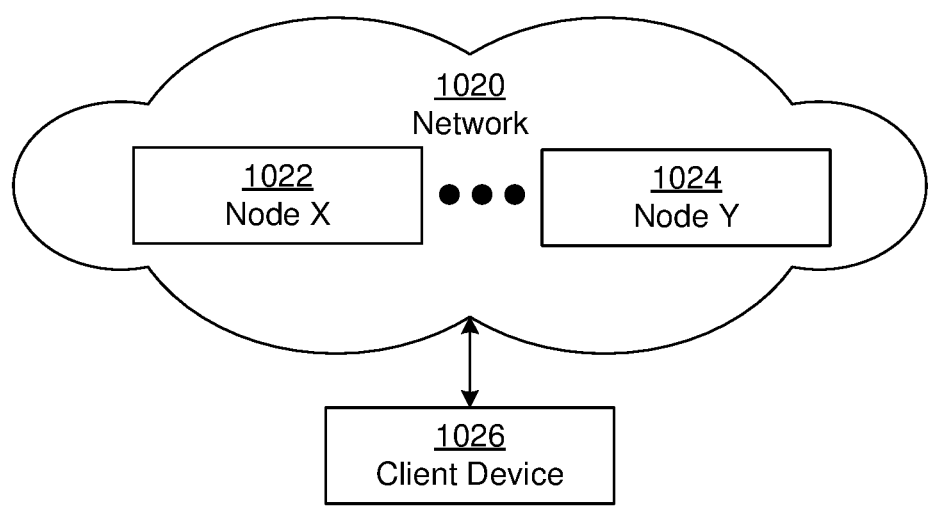

Embodiments of the disclosure may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 10.1, the computing system (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), and numerous other elements and functionalities that implement the features and elements of the disclosure.

The computer processor(s) (1002) may be an integrated circuit for processing instructions. For example, the computer processor(s) may be one or more cores or micro-cores of a processor. The computing system (1000) may also include one or more input devices (1010), such as a touchscreen, keyboard, mouse, microphone, touchpad, electronic pen, or any other type of input device.

The communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the computing system (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (1000) in FIG. 10.1 may be connected to or be a part of a network. For example, as shown in FIG. 10.2, the network (1020) may include multiple nodes (e.g., node X (1022), node Y (1024)). Each node may correspond to a computing system, such as the computing system shown in FIG. 10.1, or a group of nodes combined may correspond to the computing system shown in FIG. 10.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1000) may be located at a remote location and connected to the other elements over a network.

Although not shown in FIG. 10.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1022), node Y (1024)) in the network (1020) may be configured to provide services for a client device (1026). For example, the nodes may be part of a cloud computing system. The nodes may include functionality to receive requests from the client device (1026) and transmit responses to the client device (1026). The client device (1026) may be a computing system, such as the computing system shown in FIG. 10.1. Further, the client device (1026) may include and/or perform all or a portion of one or more embodiments of the invention.

The computing system or group of computing systems described in FIGS. 10.1 and 10.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 10.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 10.1, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 10.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 10.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 10.1 and the nodes and/or client device in FIG. 10.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   executing a first Optical Character Recognition (OCR) preprocessor on a plurality of training images to obtain first OCR preprocessor output;
   executing a first OCR engine on the first OCR preprocessor output to obtain first OCR engine output;
   executing a first approximator on the first OCR preprocessor output to obtain first approximator output;
   iteratively adjusting the first approximator to simulate the first OCR engine using the first OCR engine output and the first approximator output;
   generating OCR preprocessor losses using the first approximator output and a plurality of target labels; and
   iteratively adjusting the first OCR preprocessor using the OCR preprocessor losses to obtain a first customized OCR preprocessor.

2. The method of claim 1, further comprising:
   initially adjusting a base approximator on the first OCR preprocessor output to obtain the first approximator.

3. The method of claim 2, further comprising:
   initially adjusting the base approximator using a second OCR engine output of a second OCR engine to create a second approximator.

4. The method of claim 1, further comprising:
   initially adjusting a base OCR preprocessor using the plurality of target labels and the first approximator output to obtain the first OCR preprocessor.

5. The method of claim 4, further comprising:
   initially adjusting the base OCR preprocessor using the plurality of target labels and a second approximator output to obtain a second OCR preprocessor; and
   training the second OCR preprocessor for a second OCR engine to obtain a second customized OCR preprocessor.

6. The method of claim 1, wherein generating the OCR preprocessor losses comprises:
   combining an image-based loss and a text-based loss into the OCR preprocessor losses.

7. The method of claim 6, wherein the image-based loss is a mean squared error (MSE) loss and the text-based loss is connectionist temporal classification (CTC) loss.

8. The method of claim 1, wherein generating the OCR preprocessor losses comprises:
generating an image-based loss from the first OCR preprocessor output and tensor of one's;
generating a text-based loss from the first approximator output and the plurality of target labels; and
combining the image-based loss and the text-based loss into the OCR preprocessor losses.

9. The method of claim 1, wherein the first OCR preprocessor is a convolutional recurrent neural network (CRNN).

10. The method of claim 1, wherein the plurality of training images is specific to a domain, and wherein the first OCR preprocessor is customized for the first OCR engine and the domain.

11. The method of claim 1, further comprising:
executing, on an input image, the first customized OCR preprocessor to generate second OCR preprocessor output;
performing, by the first OCR engine, OCR on the second OCR preprocessor output to generate second OCR engine output; and
transmitting the second OCR engine output to a target software application.

12. A system comprising:
a computer processor; and
a training engine configured to execute on the computer processor and configured to:
trigger execution of a first Optical Character Recognition (OCR) preprocessor to preprocess a plurality of training images and to obtain first OCR preprocessor output,
trigger execution of a first OCR engine to perform OCR on the first OCR preprocessor output to obtain first OCR engine output,
trigger execution of a first approximator on the first OCR preprocessor output to obtain first approximator output,
iteratively adjust the first approximator to simulate the first OCR engine using the first OCR engine output and the first approximator output,
generate OCR preprocessor losses using the first approximator output and a plurality of target labels, and
iteratively adjust the first OCR preprocessor using the OCR preprocessor losses to obtain a first customized OCR preprocessor.

13. The system of claim 12, wherein the training engine is further configured to:
initially adjust a base approximator on the first OCR preprocessor output to obtain the first approximator.

14. The system of claim 13, wherein the training engine is further configured to:
initially adjust the base approximator using a second OCR engine output of a second OCR engine to create a second approximator.

15. The system of claim 12, wherein the training engine is further configured to:
initially adjust a base OCR preprocessor using the plurality of target labels and the first approximator output to obtain the first OCR preprocessor.

16. The system of claim 15, wherein the training engine is further configured to:
initially adjust the base OCR preprocessor using the plurality of target labels and a second approximator output to obtain a second OCR preprocessor; and
train the second OCR preprocessor for a second OCR engine to obtain a second customized OCR preprocessor.

17. The system of claim 12, wherein generating the OCR preprocessor losses comprises:
combine an image-based loss and a text-based loss into the OCR preprocessor losses.

18. The system of claim 12, wherein generating the OCR preprocessor losses comprises:
generating an image-based loss from the first OCR preprocessor output and tensor of one's;
generating a text-based loss from the first approximator output and the plurality of target labels; and
combining the image-based loss and the text-based loss into the OCR preprocessor losses.

19. A non-transitory computer readable medium comprising computer readable program code for causing a computer system to perform operations, the operations comprising:
triggering execution of an Optical Character Recognition (OCR) preprocessor to preprocess a plurality of training images and to obtain OCR preprocessor output;
triggering execution of an OCR engine to perform OCR on the OCR preprocessor output to obtain OCR engine output;
triggering execution of an approximator on the OCR preprocessor output to obtain approximator output;
iteratively adjusting the approximator to simulate the OCR engine using the OCR engine output and the approximator output;
generating OCR preprocessor losses using the approximator output and a plurality of target labels; and
iteratively adjusting the OCR preprocessor using the OCR preprocessor losses to obtain a customized OCR preprocessor.

20. The non-transitory computer readable medium of claim 19, wherein generating the OCR preprocessor losses comprises:
generating an image-based loss from the OCR preprocessor output and tensor of one's;
generating a text-based loss from the approximator output and the plurality of target labels; and
combining the image-based loss and the text-based loss into the OCR preprocessor losses.

* * * * *